United States Patent
Yu et al.

(10) Patent No.: US 8,702,835 B2
(45) Date of Patent: Apr. 22, 2014

(54) HIGH STRENGTH LOW ALLOYED SINTERED STEEL

(75) Inventors: Yang Yu, Lund (SE); Norimitsu Hirose, Tokyo (JP)

(73) Assignee: Hoganas AB (Publ), Hoganas (CH)

( * ) Notice: Subject to any disclaimer, the term of this patent is extended or adjusted under 35 U.S.C. 154(b) by 0 days.

(21) Appl. No.: 13/318,666

(22) PCT Filed: May 21, 2010

(86) PCT No.: PCT/SE2010/050551
§ 371 (c)(1),
(2), (4) Date: Dec. 15, 2011

(87) PCT Pub. No.: WO2010/134886
PCT Pub. Date: Nov. 25, 2010

(65) Prior Publication Data
US 2012/0082587 A1    Apr. 5, 2012

Related U.S. Application Data

(60) Provisional application No. 61/219,000, filed on Jun. 22, 2009.

(30) Foreign Application Priority Data

May 22, 2009 (SE) ...................................... 0900689

(51) Int. Cl.
- B22F 1/02 (2006.01)
- B22F 3/16 (2006.01)
- C22C 33/02 (2006.01)
- C22C 38/04 (2006.01)
- C22C 38/08 (2006.01)

(52) U.S. Cl.
USPC .................. 75/255; 75/252; 75/231; 75/246; 420/8; 420/119; 419/11; 419/29; 419/39; 428/570

(58) Field of Classification Search
CPC ...... B22F 1/003; B22F 1/0059; B22F 1/0215; B22F 3/02; B22F 3/1007; B22F 3/16; B22F 3/24; B22F 9/082; B22F 2998/10; B22F 2003/248; C22C 33/0264; C22C 33/006; C22C 38/04; C22C 38/08
USPC .................. 75/231, 246, 252; 419/11, 29, 39; 420/8, 119; 428/570
See application file for complete search history.

(56) References Cited

U.S. PATENT DOCUMENTS

| | | |
|---|---|---|
| 3,901,661 A | 8/1975 | Kondo et al. |
| 4,069,044 A | 1/1978 | Mocarski et al. |
| 4,266,974 A | 5/1981 | Nitta et al. |
| 4,954,171 A | 9/1990 | Takajo et al. |
| 5,605,559 A | 2/1997 | Unami et al. |
| 6,348,080 B1 | 2/2002 | Arvidsson et al. |
| 2007/0089562 A1 | 4/2007 | Unami et al. |
| 2009/0041608 A1* | 2/2009 | Ozaki et al. .................... 419/10 |

FOREIGN PATENT DOCUMENTS

| | | |
|---|---|---|
| JP | 61-139601 A | 6/1986 |
| JP | 61-139602 A | 6/1986 |
| JP | 63-137102 A | 6/1988 |
| JP | 8-209202 A | 8/1996 |
| JP | 9-95701 A | 4/1997 |
| RU | 2 043 868 C1 | 9/1995 |
| WO | WO 03/106079 A1 | 12/2003 |

OTHER PUBLICATIONS

International Search Report (PCT/ISA/210) issued on Sep. 2, 2010, by Swedish Patent Office as the International Searching Authority for International Application No. PCT/SE2010/050551.
Written Opinion (PCT/ISA/237) issued on Sep. 2, 2010, by Swedish Patent Office as the International Searching Authority for International Application No. PCT/SE2010/050551.

* cited by examiner

Primary Examiner — George Wyszomierski
Assistant Examiner — Ngoclan T Mai
(74) Attorney, Agent, or Firm — Buchanan Ingersoll & Rooney P.C.

(57) ABSTRACT

A water-atomized iron-based steel powder is provided which comprises by weight-%: 0.45-1.50 Ni, 0.30-0.55 Mo, less than 0.3 Mn, less than 0.2 Cu, less than 0.1 C, less than 0.25 O, less than 0.5 of unavoidable impurities, and the balance being iron, and where Ni and Mo have been alloyed by a diffusion alloying process.

9 Claims, 1 Drawing Sheet

HIGH STRENGTH LOW ALLOYED SINTERED STEEL

FIELD OF THE INVENTION

The present invention relates to an iron-based low alloyed powder as well as a powder composition containing the powder and additives, the method of making sintered components from the powder composition, and sintered components made from the powder composition. The powder and powder composition are designed for a cost effective production of powder sintered parts.

BACKGROUND OF THE INVENTION

In industries, the use of metal products manufacturing by compaction and sintering metal powder compositions is becoming increasingly widespread. A number of different products of varying shape and thickness are being produced and the quality requirements are continuously raised at the same time as it is desired to reduce the cost. As net shape components, or near net shape components requiring a minimum of machining in order to reach finished shape, are obtained by pressing and sintering of iron powder compositions in combination with a high degree of material utilisation, this technique has a great advantage over conventional techniques for forming metal parts such as moulding or machining from bar stock or forgings.

One problem connected to the press and sintering method is, however, that the sintered component contains a certain amount of pores, decreasing the strength of the component. Basically there are two ways to overcome the negative effect on mechanical properties caused by the component porosity. 1) The strength of the sintered component may be increased by introducing alloying elements such as carbon, copper, nickel molybdenum etc. 2) The porosity of the sintered component may be reduced by increasing the compressibility of the powder composition, and/or increasing the compaction pressure for a higher green density, or increasing the shrinkage of the component during sintering. In practise, a combination of strengthening the component by addition of alloying elements and minimising the porosity is applied.

There are three common ways of alloying iron powders: prealloying, admixing and diffusion alloying. One advantage of prealloying is that a good distribution of the alloying elements is guaranteed throughout the alloy. However, the disadvantage is that compressibility is reduced with alloying element content in a prealloyed material. When adding alloying elements by admixing, compressibility is not affected adversely. However, distribution and segregation problems can occur, since the alloying element particles often need to be much smaller than the base material particles in order to promote diffusion during sintering. Diffusion bonding is a technique that offers the middle path solution. The alloying elements are admixed to the base material, followed by a heat treatment in a reducing atmosphere, thereby bonding the smaller alloying element particles by diffusion to the larger particles, decreasing the risk of segregation while upholding good compressibility.

Chromium as an alloying element serves to strengthen the matrix by solid solution hardening. Chromium will also increase hardenability, oxidation resistance and abrasion resistance of a sintered body. Solutions exist today including chromium as alloying element. However, these products require very well controlled atmospheres during sintering in order to generate positive effects. The present invention is directed towards an alloy excluding chromium, thus resulting in lower requirements on sintering furnace equipment and/or control.

During sintering, metal powder particles of the compacted or pressed component, the green component, will diffuse together in solid state forming strong bonds, so called sintering necks. The result is a relatively high dense net shape part, or near net shape part, suitable for low or medium performance applications. Typically, sintered articles are manufactured from iron powder mixed with copper and graphite. Other types of materials suggested include iron powder prealloyed with nickel and molybdenum and small amounts of manganese to enhance iron hardenability without developing stable oxides. Machinability enhancing agents such as MnS are also commonly added.

Various automotive parts have been produced successfully by the pressing and sintering technique. It is desirable to improve the performance of sintered parts so that more parts can be replaced by this cost effective technique. However, automotive parts manufacture is a high volume and price sensitive application with strict performance, design and durability requirements. Therefore cost-efficient materials are highly desirable.

U.S. Pat. No. 3,901,661, U.S. Pat. No. 4,069,044, U.S. Pat. No. 4,266,974, U.S. Pat. No. 5,605,559, U.S. Pat. No. 6,348,080 and WO 03/106079 describe molybdenum containing powders. When powder prealloyed with molybdenum is used to produce pressed and sintered parts, bainite is easily formed in the sintered part. In particular, when using powders having low contents of molybdenum, the formed bainite is coarse impairing machinability, which can be problematic in particular for components where good machinability is desirable. In addition, molybdenum is a very expensive as alloying element.

However, in U.S. Pat. No. 5,605,559 a microstructure of fine pearlite has been obtained with a Mo-alloyed powder by keeping Mn very low. It is stated that Mo improves the strength of steel by solution hardening and precipitation hardening of Mo carbide, and the like. However, when Mo content is less than about 0.1 wt-%, its effect is small. Mn improves the strength of a heat-treated material by improving its hardenability. However, when Mn content exceeds about 0.08 wt-%, oxide is produced on the surface of alloyed steel powders such that compressibility is lowered. However, keeping the Mn content low can be expensive, in particular when using cheap steel scrap in the production, since steel scrap often contains Mn of 0.1 wt-% and above. Thus, a powder produced accordingly will be comparably expensive.

U.S. Pat. No. 4,954,171 describes a powder to be used for the production of sintered parts by powder metallurgy and a high-strength sintered alloy steel. However, said alloy contains high amounts of Mo, as 0.65-3.50 wt-% is claimed. The results presented have been obtained by using costly processing routes, such as double compaction and high temperature sintering.

OBJECTS OF THE INVENTION

An object of the invention is to provide an iron-based, low alloyed powder suitable for producing sintered components, such as automotive components.

Another object of the invention is to provide a diffusion bonded powder alloy with a high performance/cost ratio.

Another object of the invention is to provide a sintered component having high strength achieved by a cost efficient processing route, preferably single compaction followed by sintering at regular temperatures followed by heat treatment.

Examples of such components are gears, sprockets such as cam shaft and crank shaft sprockets, synchronizing hubs etc.

SUMMARY OF THE INVENTION

At least one of these objects is accomplished by:

A water-atomized low alloyed steel powder, which comprises in % by weight: 0.45-1.50 Ni, 0.3-0.55 Mo, 0.09-0.3 Mn, less than 0.2 Cu, less than 0.1 C, less than 0.25 O, less than 0.5 of unavoidable impurities, with the balance being iron. Where Ni and Mo have been alloyed by diffusion alloying method.

A composition based on the steel powder having, by weight-% of the composition: 0.35-1.0 C in the form of graphite, and optionally 0.05-2.0 lubricant and/or 0-3.0 Cu in the form of copper powder, and optionally hard phase materials and machinability enhancing agents.

A method for producing sintered and component comprising the steps of:
a) preparing an iron-based steel powder composition of above;
b) subjecting the composition to compaction between 400 and 2000 MPa;
c) sintering the obtained green component in a reducing atmosphere at temperature between 1000-1400° C.; and
d) subjecting the obtained sintered component to heat treatment, such as quenching and tempering.

A component made from the composition.

The steel powder has low and defined contents of alloying elements and is essentially free from chromium and vanadium and has proved to be able to provide a component that has a tensile strength of at least 1000 MPa, preferably above 1020 MPa, and most preferably above 1040 MPa when sintered at 1120° C. for 20 minutes and subsequently oil quenched and tempered.

BRIEF DESCRIPTION OF FIGURES

In the following the invention will be clarified by referring to attached figures, in which.

DETAILED DESCRIPTION OF THE INVENTION

Figure 1:
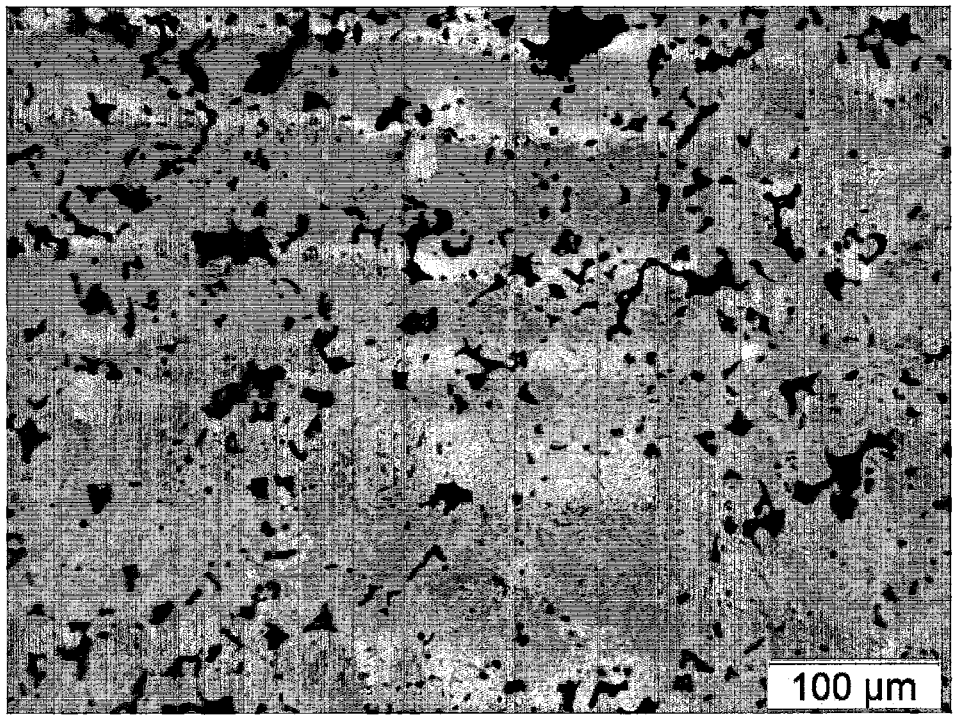
FIG. 1 shows the metallographic image taken from a sample from a first material, Material A, that demonstrate a close to fully martensitic structure and very few spotty Ni-rich austenite areas (seen as bright spots in the image) in accordance with the invention, and, FIG. 2 shows the metallographic image from a prior art material, a sample called ref 2, which shows a martensitic structure having many Ni-rich austenite areas (seen as bright spots in the image).

Preparation of the Iron-Based Alloyed Steel Powder.

Pure iron powder is produced by water-atomization of an iron melt. The atomized powder can further be subjected to a reduction annealing process, before being alloyed by using a diffusion alloying process. The particle size of the diffusion bonded powder alloy could be any size as long as it is compatible with the press and sintering or powder forging processes. Examples of suitable particle size is the particle size of the known powder ASC100.29 available from Höganäs AB, Sweden, having maximum 2.0% by weight above 180 μm and 15-30% by weight below 45 μm.

Contents of the Steel Powder

Manganese will increase the strength, hardness and hardenability of the steel powder. Also, if the manganese content is too low, it is not possible to use cheap recycled scrap unless a specific treatment for the reduction during the course of the steel manufacturing is carried out, which increases costs. A Mn content above 0.3 wt-% will increase the formation of manganese containing inclusions in the steel powder and will also have a negative effect on the compressibility due to solid solution hardening and increased ferrite hardness. Therefore, the Mn content should not exceed 0.3 wt-%. Thus, manganese content preferably should be above 0.1 wt-% but lower than 0.3 wt-%, more preferably in the range of 0.15-0.30 wt-%.

Nickel increases strength and hardness while providing good ductility properties. However, less than 0.45 wt-% of Ni will not produce enough alloying effect for hardenability and could also jeopardize an even distribution of Ni in the component. A content above 1.50 wt-% will tend to form Ni-rich austenite during heat treatment conditions, which will lower the strength of the material. Ni, however, is a costly element and is therefore desirable to keep as low as possible. Furthermore, we have found that a Ni content below 0.90 wt-%, and even below 0.65 wt-%, results in sufficient properties of the final product, when Ni is diffusion bonded to the surface of the iron powder. Therefore it is preferred that the Ni content is at most 0.90 wt-%, more preferably at most 0.65 wt-%. Thus, Ni-content should be in the range of 0.45-0.90 wt-%, and preferably 0.45-0.65 wt-%. In this range, fully diffusion bonded Ni contributes more for the sintering neck strength compared to prealloyed Ni. Preferably all of the Ni content is present as diffusion bonded Ni, i.e. bonded to the surface of the iron powder. However, small amounts of Ni may be acceptable as prealloyed Ni, preferably below 0.05 wt-%.

Oxygen is at most 0.25 wt-%. A too high content of oxides impairs the strength of the sintered and optionally forged component, and impairs the compressibility of the powder. For these reasons, O preferably is at most 0.18 wt-%.

Copper should be less than 0.2 wt-%, and chromium less than 0.1 wt-%.

Molybdenum stabilizes ferrite after sintering. Components with less than 0.3% Mo present in the Fe—Ni system show poor hardness. Having a high Mo content will not contribute enough to performance. The optimized Mo content for this system is 0.3-0.55 wt-%, preferably 0.35-0.55 wt-%, and most preferably 0.40-0.55 wt-%. In this range, diffusion bonded Mo performs better than prealloyed Mo. The reason being that the limited Mo content located in the particle boundary regions contributes more to the hardenability than that in the matrix. Preferably all of the Mo content is present as diffusion bonded Mo, i.e. bonded to the surface of the iron powder. However, small amounts of Mo may be acceptable as prealloyed Mo, preferably below 0.05 wt-%.

Carbon in the steel powder shall be at most 0.1% by weight and nitrogen at most 0.1% by weight. Higher contents will unacceptably reduce the compressibility of the powder.

The total amount of incidental impurities such as phosphorous silicon, aluminium, chromium, vanadium and the like should be less than 0.5% by weight in order not to deteriorate the compressibility of the steel powder or act as formers of detrimental inclusions, preferably less than 0.3 wt-%.

It has surprisingly been found that the effect of sintering neck strengthening provided by the powder composition has a higher impact on properties after sintering and heat treatment than previously believed, resulting in sintered components with tensile strength of at least 1000 MPa, preferably above 1020 MPa, and most preferably above 1040 MPa at a sintered density of at least 7.0 g/cm$^3$, preferably at least 7.1 g/cm$^3$. This level of sintered density and tensile strength may as an example be achieved by compaction at 600 MPa followed by sintering at 1120° C. for 20 minutes and subsequently oil quenched and tempered.

Powder Composition

Before compaction, the iron-based steel powder is mixed with graphite, and optionally copper powder and/or lubricants, and optionally hard phase materials and machinability enhancing agents.

In order to enhance strength and hardness of the sintered component, carbon is introduced in the matrix. Carbon, C, is added as graphite in amount between 0.35-1.0% by weight of the composition. An amount less than 0.35 wt-% C will result in a too low strength and an amount above 1.0 wt-% C will result in an excessive formation of carbides yielding a too high hardness and impair the machinability properties. If, after sintering, the component is to be heat treated according to a heat treatment process including carburising or carbonitriding, graphite additions may be excluded or limited to less than 0.35%.

Lubricants are added to the composition in order to facilitate the compaction and ejection of the compacted component. The addition of lubricants in an amount of less than 0.05% by weight of the composition will have insignificant effect and the addition of above 2% by weight of the composition will result in a too low density of the compacted body. Lubricants may be chosen from the group of metal stearates, waxes, fatty acids and derivates thereof, oligomers, polymers and other organic substances having lubricating effect.

Copper, Cu, is a commonly used alloying element in the powder metallurgical technique. Cu will enhance the strength and hardness through solid solution hardening. Cu also will facilitate the formation of sintering necks during sintering, as copper melts before the sintering temperature is reached providing so called liquid phase sintering. The powder may optionally be admixed with Cu, preferably in an amount of 0-3 wt-% Cu.

Other substances, such as hard phase materials, and machinability enhancing agents, such as MnS, $MoS_2$, $CaF_2$, and different kinds of minerals etc. may be added.

Sintering

The iron-based powder composition is transferred into a mould and subjected to a compaction pressure of about 400-2000 MPa to a green density of above about 6.75 g/cm³. The obtained green component further is subjected to sintering in a reducing atmosphere at a temperature of about 1000-1400° C. If the component is to be sintered at regular sintering temperatures, this usually is performed at 1000-1200° C., preferably 1050-1180° C., most preferably 1080-1160° C. If the component is to be sintered at high temperature, this usually is performed at 1200-1400° C., preferably at 1200-1300° C., and most preferably at 1220-1280° C.

Post Sintering Treatments

To obtaining a desired microstructure, the sintered component may be subjected to a heat treatment process including a controlled cooling rate. The hardening process may include known processes such as quench and temper, case hardening, nitriding, carburizing, nitrocarburizing, carbonitriding, induction hardening and the like. Alternatively, a sinter-hardening process at high cooling rate may be utilized. In case that heat treatment includes carburizing, the amount of added graphite may be in the range 0.15-0.35 wt %.

Other types of post sintering treatments may be utilized, such as surface rolling or shot peening, which introduces compressive residual stresses enhancing the fatigue life.

Properties of the Finished Component

The present invention provides a new low alloyed material having high tensile strength of at least 1000 MPa, preferably above 1020 MPa, and most preferably above 1040 MPa, at a sintered density of at least 7.0 g/cm³, preferably at least 7.1 g/cm³. This level of sintered density and tensile strength may as an example be achieved by compaction at 600 MPa followed by sintering at 1120° C. for 20 minutes and subsequent oil quenching and tempering.

With the low alloyed water-atomized powder of the present invention, it is possible to produce sintered components having a microstructure characterized by a invited/low amount of spotty Ni-rich austenite in a matrix comprising martensite. The matrix may also comprise martensite and bainite and/or pearlite. The matrix is also characterized by having non-homogeneously distributed Mo.

It has also surprisingly been found that the machinability of components according to the invention, in their as-sintered state, is much better than that of as-sintered components made from higher alloyed materials.

EXAMPLE 1

Alloyed iron-based steel powders were produced by admixing alloying elements to pure iron powder, and by heat treatment of the powder mixture in reducing atmosphere, bonding the smaller alloying element particles by diffusion to the larger particles. Table 1 shows the chemical compositions of the different powders. The particle sizes of the all powders (A, B, Ref 1-3) were below 150 μm. Powder A, B were both based on iron powder ASC100.29, available from Höganäs AB, and were diffusion bonded with a Ni-containing powder (fine particles of essentially pure Ni) and a Mo-containing powder (fine particles of Mo-oxides). Ref. 1 was based on iron powder ASC100.29, available from Höganäs AB, and was diffusion bonded with a Ni-containing powder (fine particles of essentially pure Ni) and a Mo-containing powder (fine particles of Mo-oxides). Ref. 2 was based on iron powder ASC100.29, available from Höganäs AB, and was diffusion bonded with a Ni-containing powder (fine particles of essentially pure Ni), a Mo-containing powder (fine particles of Mo-oxides) and a Cu-containing powder (fine particles of essentially pure Cu). Ref. 3 was prepared as a pre-alloyed powder. The chemical analyses of the diffusion bonded powders (A, B, Ref. 1, and Ref. 2) and the pre-alloyed powder (Ref. 3) are shown in table 1.

TABLE 1

Chemical composition of steel powders A, B, and References

| Powder | Mo [%] | Ni [%] | Cu [%] | Mn [%] | C [%] | O [%] |
|---|---|---|---|---|---|---|
| A | 0.50 | 0.50 | — | 0.17 | 0.002 | 0.08 |
| B | 0.51 | 0.87 | — | 0.12 | 0.002 | 0.08 |
| Ref. 1 | 0.89 | 0.89 | — | <0.10 | 0.002 | 0.08 |
| Ref. 2 | 0.50 | 4.0 | 1.5 | <0.10 | 0.002 | 0.08 |
| Ref. 3 (pre-alloyed) | 0.60 | 0.45 | | 0.3 | 0.004 | 0.13 |

The obtained steel powders were mixed with 0.6% by weight of the composition of graphite UF4, from Kropfmühl, and 0.8% of Amide Wax PM, available from Höganäs AB, Sweden.

The obtained powder compositions were transferred to a die and compacted to form green components at a compaction pressure of 600 MPa. The compacted green components were sintered in a laboratory belt furnace at a temperature of 1120° C. for 20 minutes in an atmosphere of 90% nitrogen and 10% hydrogen.

The sintered specimens were heated in an atmosphere with a carbon potential of 0.6% at 840° C. for 20 minutes, followed by oil quenching. The specimens further were subjected to tempering in air at 200° C. for 60 minutes.

The sintered specimens were tested for tensile strength and elongation according to ASTME9-89C and hardness, HRC according to SS-EN ISO 6508-1. Impact energy was tested according to EN10045-1.

Table 2 shows added amounts of graphite to the composition before producing the test samples, and results from chemical analysis of the 1120° C. sintered and heat treated specimens. It also shows results from tensile strength testing, impact energy testing, and hardness testing.

TABLE 2

Amount of added graphite, analyzed C, results from tensile testing, impact energy testing and hardness testing.

| Powder composition based on powder | Added graphite [%] | C [%] | O [%] | Sintered density [g/cm³] | Yield strength [MPa] | Tensile strength [MPa] | Elongation [%] | Hardness [HRC] | Impact energy [J] |
|---|---|---|---|---|---|---|---|---|---|
| A | 0.6 | 0.56 | 0.06 | 7.10 | 1040 | 1042 | 0.20 | 34.0 | 9.3 |
| B | 0.6 | 0.55 | 0.06 | 7.11 | 1050 | 1093 | 0.27 | 35.9 | 11.0 |
| Ref. 1 | 0.6 | 0.57 | 0.06 | 7.09 | 1044 | 1050 | 0.21 | 36.2 | 9.4 |
| Ref. 2 | 0.6 | 0.51 | 0.04 | 7.08 | 837 | 1015 | 0.57 | 30.5 | 13.3 |
| Ref. 3 | 0.6 | 0.59 | 0.08 | 6.99 | — | 873 | 0.12 | 33.4 | 5.8 |

The low alloyed samples based on powders A and B show a yield strength that is similar to the strength of samples based on Ref. 1 after heat-treatment. They show a yield strength that is higher than the strength of samples based on the high alloyed Ref. 2, and they show a tensile strength that is higher than that of samples based on the pre-alloyed Ref. 3. The higher content of Mo in Ref. 1 does not produce any positive effect.

The low alloyed samples based on powders A and B show a tensile strength that is similar to or higher than the strength of samples based on Ref. 1 after heat-treatment. They show a tensile strength that is higher than the strength of samples based on the high alloyed Ref. 2, and they show a tensile strength that is higher than the strength of samples based on the pre-alloyed Ref. 3. Nor here does the higher content of Mo in Ref. 1 produce any positive effect.

The elongation of samples prepared from A and B is similar to or higher than the elongation of samples based on Ref. 1. It is higher than the elongation of pre-alloyed materials, but it is lower than the elongation of samples based on the high alloyed Ref. 2. Compared to the samples based on pre-alloyed Ref. 3, the elongation is better.

The hardness of samples prepared from A and B is similar to the hardness of samples prepared from Ref. 1. No positive effect is observed from high Mo content. The hardness is higher than the hardness of samples based on the high alloyed Ref. 2 thanks to less Ni-rich retained austcnite in the predominantly martensitic microstructure. The hardness is also higher than for the samples based on pre-alloyed material Ref. 3.

The impact energy test results of samples prepared from A and B is similar to the impact energy test results of samples prepared from Ref. 1. It is somewhat lower than the impact energy test results of samples prepared from Ref. 2, and it is higher than the impact energy test results of samples prepared from Ref. 3.

EXAMPLE 2

Samples were produced and tested according to example 1, with the exception of sintering temperature, which was 1250° C. Table 3 shows added amounts of graphite to the composition before producing the test samples, and results from chemical analysis of the 1250° C. sintered and heat treated specimens. It also shows results from tensile strength testing, impact energy testing, and hardness testing.

TABLE 3

Amount of added graphite, analyzed C, results from tensile testing, impact energy testing and hardness testing.

| Powder composition based on powder | Added graphite [%] | C [%] | O [%] | Sintered density [g/cm³] | Yield strength [MPa] | Tensile strength [MPa] | Elongation [%] | Hardness [HRC] | Impact energy [J] |
|---|---|---|---|---|---|---|---|---|---|
| A | 0.6 | 0.59 | 0.03 | 7.16 | 1146 | 1220 | 0.32 | 38.2 | 15.2 |
| B | 0.6 | 0.62 | 0.02 | 7.18 | 1168 | 1275 | 0.38 | 38.9 | 18.0 |
| Ref. 1 | 0.6 | 0.63 | 0.03 | 7.15 | 1171 | 1279 | 0.39 | 38.9 | 17.5 |
| Ref. 2 | 0.6 | 0.49 | 0.03 | 7.17 | 997 | 1236 | 0.82 | 34.0 | 19.6 |
| Ref. 3 | 0.6 | 0.60 | 0.05 | 7.06 | — | 1061 | 0.12 | 36.9 | 12.0 |

The low alloyed samples based on powders A and B show a yield strength that is similar to the yield strength of samples based on Ref. 1 after heat-treatment. They show a yield strength that is higher than the yield strength of the samples based on the high alloyed Ref. 2, and they show a tensile strength that is higher than the tensile strength of the samples based on the pre-alloyed Ref. 3. The higher content of Mo in Ref. 1 does not produce any positive effect.

The low alloyed samples based on powders A and B show a tensile strength that is similar to the strength of samples based on Ref. 1 and Ref. 2 after heat-treatment, and they show a tensile strength that is higher than the strength of the samples based on the pre-alloyed Ref. 3. Nor here does the higher content of Mo in Ref. 1 produce any positive effect.

The elongation of the samples prepared from A and B is similar to the elongation of the samples based on Ref. 1. It is higher than the elongation of pre-alloyed materials, but it is lower than the elongation of the samples based on the high alloyed Ref. 2. Compared to the samples based on pre-alloyed Ref. 3, the elongation is better.

The hardness of samples prepared from A and B is similar to the hardness of samples prepared from Ref. 1. No positive effect is observed from high Mo content. The hardness is higher than the hardness of the high alloyed Ref. 2 thanks to less Ni-rich retained austenite in the predominantly martensitic microstructure. The hardness is also higher than for the samples based on the pre-alloyed powder Ref. 3.

The impact energy test results of samples prepared from A and B is similar to the impact energy test results of samples prepared from Ref. 1 and Ref. 2, and it is higher than the impact energy test results of samples prepared from Ref. 3.

The results show that for high strength and high hardness, the most favourable way to add alloying elements in this alloying system and for heat treatment processes similar as described in the examples, is by diffusion alloying. Further, when high strength and high hardness are desired, the addition of Ni should be moderate, since with high contents the presence of retained austenite lowers hardness and strength. Further, addition of Mo above 0.55% does not provide any improvement in mechanical performance.

Figure 2:
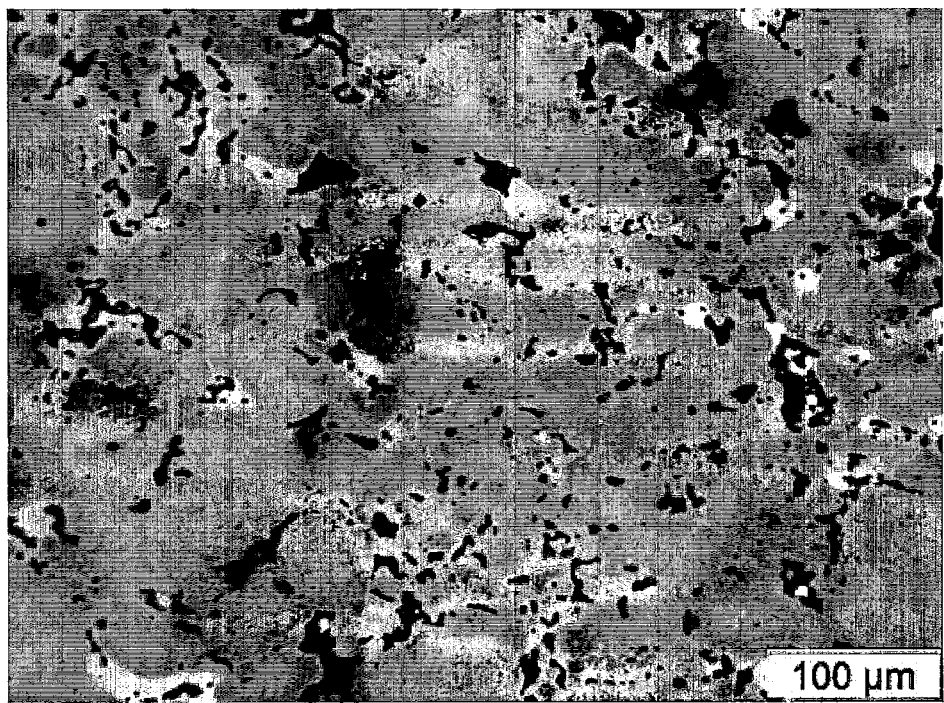

In addition, tensile strength samples based on powders A and Ref. 2 as in table 3, were evaluated metallographically using standard LOM and etching techniques. In FIG. 1 the metallographic image is taken from a sample made from Material A, that demonstrate a close to fully martensitic structure and very few spotty Ni-rich austenite areas (seen as bright spots in the image). In FIG. 2 the metallographic image is taken from a sample made from ref 2, which shows a martensitic structure having many Ni-rich austenite areas (seen as bright spots in the image).

EXAMPLE 3

Samples based on powders A and ref 2 were produced and tested according to example 1, with the exceptions of sintering temperature, which was 1250° C., and in that the samples were not subjected to heat treatment after sintering, i.e. the samples were in as-sinetered state. Graphite and/or the machinability enhancing agent MnS were mixed with the powders according to the specifications of table 4. Machinability tests were performed on the samples, by drilling and counting the amount of drilled holes before total drill failure. The result are shown in Table 4.
Test geometry: Ø80×12 mm
Drill type: Dormer Ø3.5, A002
Cutting data: Cutting speed, Vc=40 m/min
  Feed, f=0.06 mm/rev
  Cutting depth, ap=9.6 mm (blind), dry

TABLE 4

Results of machinability tests

| Base powder | Graphite [%] | MnS [%] | # holes/drill | Used drills | Time [min] |
|---|---|---|---|---|---|
| A | 0.6 | — | 2400 | 1 | 79 |
| A | 0.6 | 0.5 | >>2400 | 1 | >79 |
| Ref2 | 0.6 | 0.5 | 20 | 4 | 1 |

As can bee seen in table 4, the machinability of as-sintered components based on powder A is much better than that of the samples based on Ref2. Even samples based on powder A without the addition of the MnS were better than the samples based on Ref2 having MnS as a machinablity enhancing agent.

The invention claimed is:

1. A water-atomised iron-based steel powder which comprises in % by weight
   0.45-0.65 Ni,
   0.45-0.55 Mo,
   0.15-0.3 Mn,
   less than 0.2 Cu,
   less than 0.1 C,
   less than 0.25 O,
   less than 0.5 of unavoidable impurities,
   and the balance being iron,
   and where Ni and Mo have been alloyed by a diffusion alloying process.

2. An iron-based powder composition comprising a steel powder according to claim 1 mixed with 0.35-1.0% by weight of the composition of graphite, and optionally 0.05-2.0% by weight of the composition of lubricants, and/or copper in an amount of 0-3.0% by weight; and optionally hard phase materials and machinability enhancing agents.

3. A method for producing a sintered component, comprising the steps of:
   a) preparing an iron-based steel powder composition as defined in claim 2;
   b) subjecting the composition to compaction at a pressure between 400 and 2000 MPa;
   c) sintering the obtained green component in a reducing atmosphere at a temperature between 1000-1400° C.; and
   d) optionally subjecting the obtained sintered component to heat treatment by quenching and tempering.

4. A sintered component produced from the composition according to claim 2.

5. A component according to claim 4, having a tensile strength of at least 1000 MPa, and a sintered density of at least 7.0 g/cm³.

6. A component according to claim 4, having a tensile strength above 1020 MPa, and a sintered density of at least 7.1 g/cm³.

7. A component according to claim 4, having a tensile strength above 1040 MPa, a sintered density of at least 7.1 g/cm³, and a microstructure characterized by a low amount of spotty Ni-rich austenite in a matrix comprising martensite.

8. A method for producing a sintered component, comprising the steps of:
   a) preparing an iron-based steel powder composition as defined in claim 2;
   b) subjecting the composition to compaction at a pressure between 400 and 1000 MPa;
   c) sintering the obtained green component in a reducing atmosphere at a temperature between 1100-1300° C.; and
   d) optionally subjecting the obtained sintered component to heat treatment by quenching and tempering.

9. A method for producing a sintered component, comprising the steps of:
   a) preparing an iron-based steel powder composition as defined in claim 2;
   b) subjecting the composition to compaction at a pressure between 500 and 800 MPa;
   c) sintering the obtained green component in a reducing atmosphere at a temperature between 1100-1300° C.; and
   d) optionally subjecting the obtained sintered component to heat treatment by quenching and tempering.

* * * * *